(No Model.)  2 Sheets—Sheet 1.
J. W. POOL.
COMBINED CULTIVATOR AND PLANTER.
No. 289,707. Patented Dec. 4, 1883.
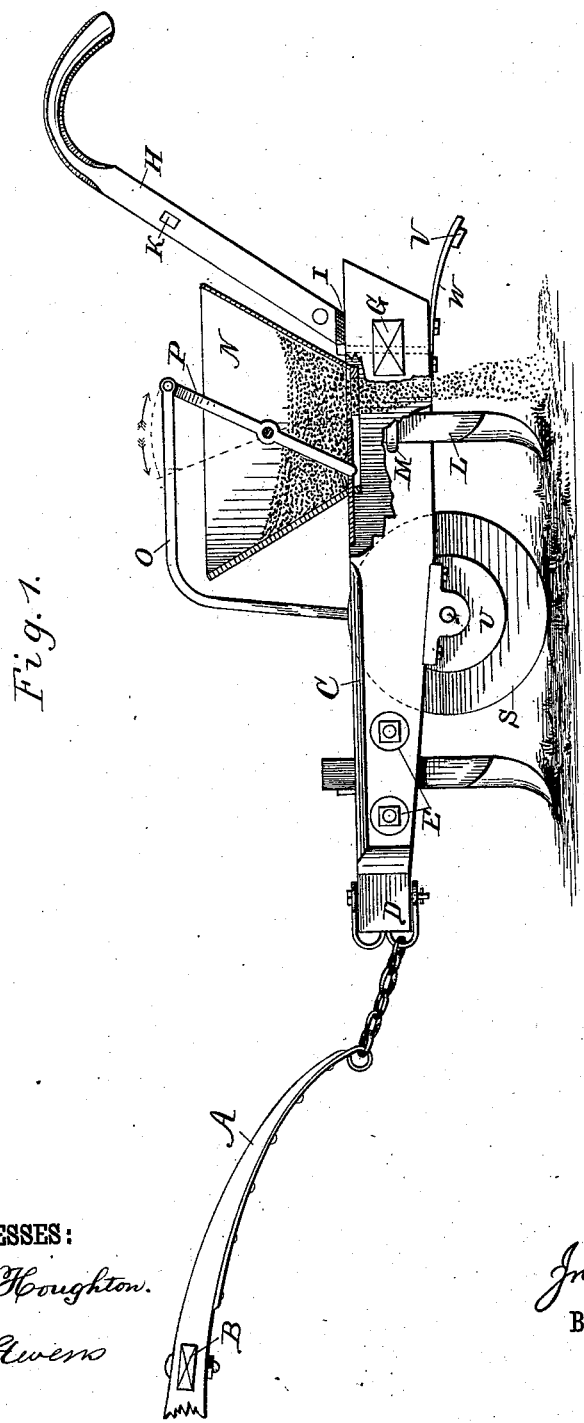
WITNESSES:
Thos. Houghton.
W. X. Stevens.
INVENTOR:
Jno. W. Pool
BY Munn & Co.
ATTORNEYS.

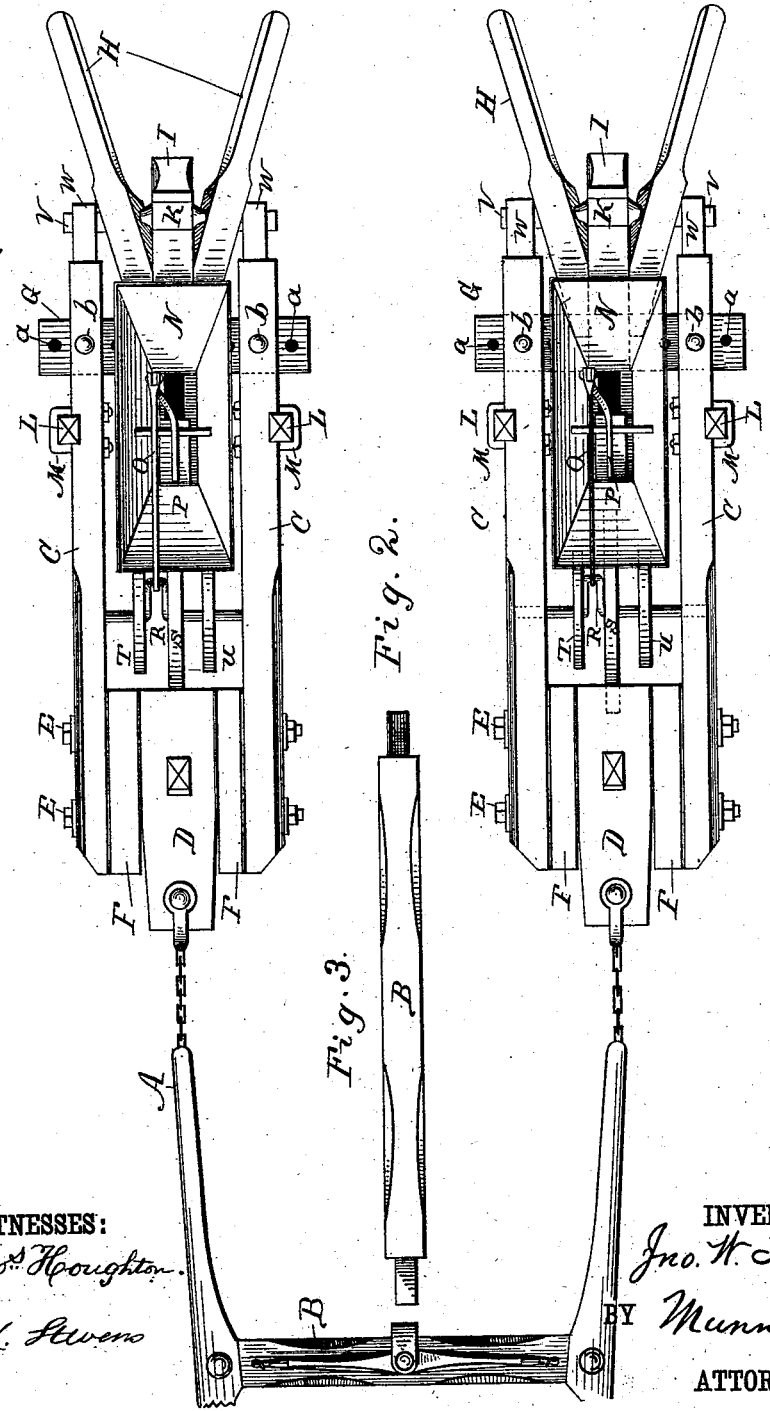

UNITED STATES PATENT OFFICE.

JOHN WILLIAM POOL, OF SMITHFIELD, NORTH CAROLINA.

COMBINED CULTIVATOR AND PLANTER.

SPECIFICATION forming part of Letters Patent No. 289,707, dated December 4, 1883.

Application filed June 22, 1883. (No model.)

*To all whom it may concern:*

Be it known that I, JOHN WILLIAM POOL, a citizen of the United States, residing at Smithfield, in the county of Johnston and State of North Carolina, have invented a new and useful Improvement in Combined Cultivators and Planters, of which the following is a specification.

My invention relates to that class of planters used in planting seed in rows, and to cultivators adapted to work the soil between the rows after the plants are up; and the object of my invention is to produce an implement which may be used for either of these purposes with economy both in first cost and in expense for power to operate the same.

To this end my invention consists in the construction and combination of parts hereinafter described and claimed, reference being had to the accompanying drawings, in which—

Figure 1 is a side elevation of my combined planter and cultivator, a portion being broken away to show the works of the planter. Fig. 2 is a plan view of the same, and Fig. 3 is a detail view of one of the cross-bars for the shaft.

A represents a pair of shafts like common wagon-shafts, provided with two or more cross-bars, B, of different lengths, all adapted to fit the same mortises in the shafts and to be alternately held therein by removable bolts and nuts. These shafts are thus laterally adjustable. To the rear end of each of these shafts I attach a separate cultivator and planter combined, each one being complete in itself and just like the other.

C represents the side beams of a cultivator secured to a central nose-piece, D, by two screw-bolts, E.

F represents filling-blocks used to extend the harrow to any desired width by filling in between the side beams and nose-piece.

G is a cross-bar, neatly fitted through horizontal mortises in the side beams C, and provided with a series of holes, *a*, registering with holes through each side beam, into which pins *b* are inserted to stiffen the frame of the cultivator at all required widths.

H is a pair of handles, secured at their lower ends to a central post, I, and higher secured to a cross-bar, K, framed to said post. This post is rigidly framed at its lower end into cross-bar G, and by the cross-bar being adjustable the handles may be set to one side of center, if desired, so that the cultivator may run straddle of the row, and yet the attendant be allowed to walk on one side of the row directly behind the handles.

L L are the teeth or plows used in straddle-row cultivating. The shanks of these plows are square, and fit closely into vertical grooves in the sides of beams C, where they are held by eye-bolts M with screw-nuts.

When the cultivator is used between rows, or for planting seed in the rows, I provide another plow, whose shank is centrally secured in the nose-piece D.

The planter attachment consists of a hopper, N, for carrying the seed, a slit in the bottom thereof, and a lever, P, working longitudinally in said slit, and carrying a slide partly covering the same to assist the seed to escape, and to regulate the amount of delivery, a crooked pitman, O, connecting the lever with a crank, R, in the shaft of the colter or seed-furrow wheel S, and two smaller wheels, T U, on the crank-shaft, to insure its turning at a regular speed, whether the wheel S be buried much or little into the ground.

V is the coverer, consisting of a cross-bar hung to the frame by two springs, W, which drag the bar on the earth behind the seed-dropper, pressing the earth onto the seed.

Cultivating and seed-dropping are both light work for a horse, and my two cultivators are readily drawn by one horse, while they are followed by two persons to guide them. By the combination of two cultivators or seed-droppers with one pair of shafts, the horse is enabled to travel between the two rows being dropped or cultivated, while each cultivator runs directly over or straddling the row, and twice as much work as usual is done by one horse.

By means of my several cross-bars of different lengths all fitting the same shafts, I am able to set the two cultivators to run at distances apart to correspond to different widths of field-rows.

The seed-dropping attachment may be readily removed when the implement is to be used for a cultivator only.

The shafts have a single-tree pivoted to their cross-bar as usual for shafts, and by this arrangement of shafts and cultivators I am able to control two independent cultivators behind one horse, so as to properly straddle and cultivate two separate rows and to turn corners, in a manner that could not be done with a mere double-tree with a single-tree and two cultivators attached.

I am aware that Patent No. 178,808 shows a seed-dropper like mine excepting my combined colter and small side wheels.

What I claim as my invention, and wish to secure by Letters Patent, is—

1. The combination, with a pair of shafts having a cross-bar rigidly framing them together near their rear ends, of a cultivator loosely hitched to each shaft, said cultivators being each complete and independent of the other, as described.

2. In a cultivator and planter, the combination of two mortised shafts adapted to receive cross-bars of different lengths, means for rigidly securing either of said cross-bars to both of the shafts, and an independent cultivator hitched to each shaft, substantially as shown and described.

3. The side bars of a cultivator, having horizontal transverse mortises near their rear ends and adjustably connected at their forward ends, in combination with a cross-bar fitting said mortises to slide therein, means for securing the cross-bar at various points of its length in the mortises, and a pair of handles rigidly secured upon said cross-bar, as described, whereby the sides of the cultivator may be adjusted at various distances apart on said cross-bar, and whereby the cross-bar may be laterally adjusted in the side bars to bring the handles central or to either side of the center of the cultivator, and yet maintain the handles parallel with the line of travel.

JOHN WILLIAM POOL.

Witnesses:
WILLIAM N. BENTON,
DAVID O. WOODALL.